May 18, 1937.  W. E. KING  2,081,040
PACKING
Filed June 17, 1932
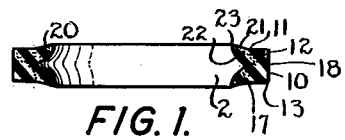
FIG. 1.
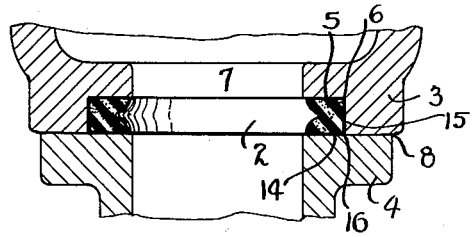
FIG. 2.
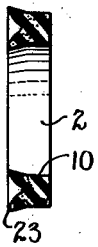
FIG. 7.
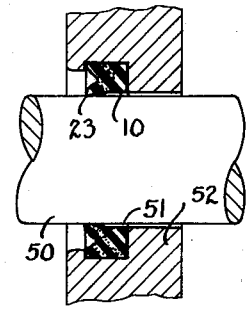
FIG. 8.
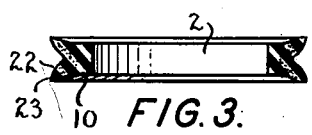
FIG. 3.
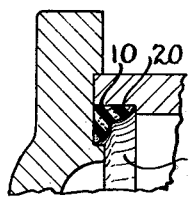
FIG. 11.
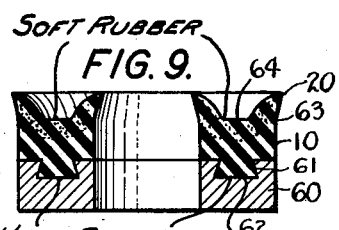
FIG. 9.
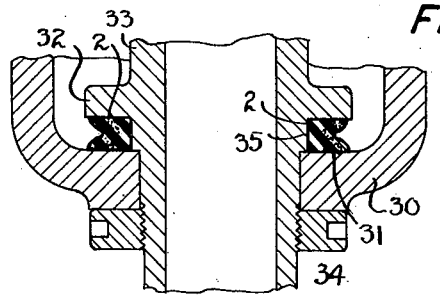
FIG. 4.
FIG. 10.
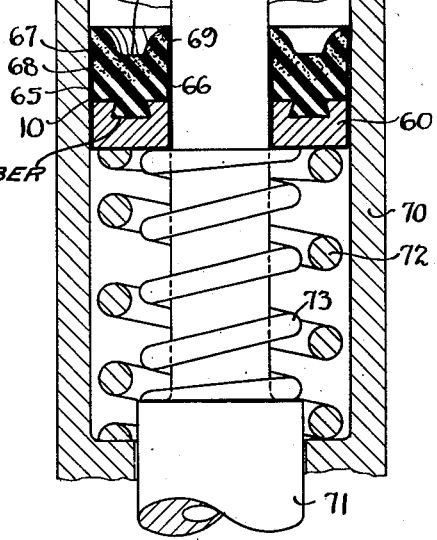
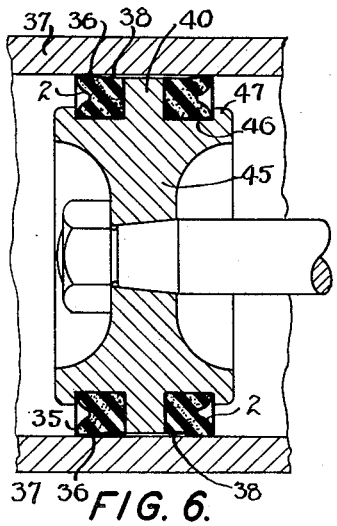
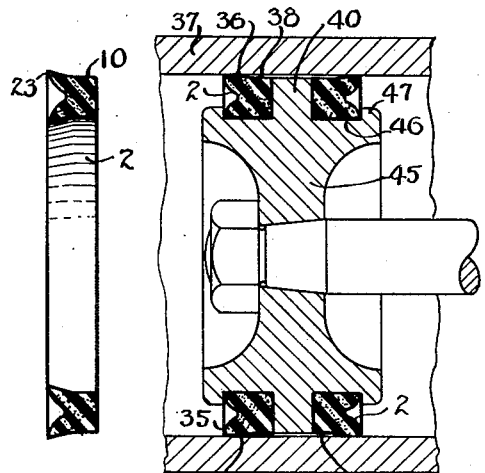
FIG. 5.    FIG. 6.
WALTER E. KING
INVENTOR.
BY Jesse R. Stone
Lester B. Clark
ATTORNEYS.

Patented May 18, 1937

2,081,040

UNITED STATES PATENT OFFICE 2,081,040

PACKING

Walter E. King, Houston, Tex., assignor to J. S. Abercrombie, Houston, Tex.

Application June 17, 1932, Serial No. 617,836

7 Claims. (Cl. 309—33)

The invention relates to an improvement in packing elements of the resilient type and particularly relates to a packing which is composed of materials of different degrees of hardness so that a proper backing or support will be provided for the more flexible sealing portion of the packing.

It is one of the objects of the invention to provide a packing wherein a support portion is formed of more rigid material than the sealing portion of the packing.

Another object of the invention is to provide a backing for a packing ring which is preferably formed integrally with the packing but which is of more rigid material so that it will reinforce the more resilient face of the packing.

Another object of the invention is to provide a gasket for abutting surfaces wherein a more rigid portion is provided on the gasket adjacent the contacting surfaces being sealed.

Another object of the invention is to provide a packing for relatively movable members wherein a rigid portion is provided on the low pressure side of the packing.

Another object of the invention is to provide a packing having a more resilient portion on the high pressure side than on the low pressure side.

Another object of the invention is to provide a packing for pistons and rods which will have a rigid portion adjacent the packing support so that there will be no flowing of the packing material into the area between the moving surfaces.

Another object of the invention is to provide a packing which is molded to a metal base and wherein the packing is composed of more rigid material adjacent the metal support and with more resilient material on the exposed faces.

Other and further objects of the invention will be readily apparent when the following description is considered in connection with the accompanying drawing wherein—

Fig. 1 is a transverse sectional view of a packing ring or gasket made up in accordance with the invention.

Fig. 2 shows the gasket of Fig. 1 in position between the abutting surfaces.

Fig. 3 is another form of packing or gasket which is adapted to form a seal when the pressure is applied against the outer surface thereof.

Fig. 4 shows the packing of Fig. 3 in sealing position.

Fig. 5 shows another form of the invention which embodies a packing ring which may be used to withstand pressure axially of the packing.

Fig. 6 shows the packing of Fig. 5 in position on a pump piston which piston may be of the type used in the blowout preventer or slush pumps in the drilling of wells.

Fig. 7 shows a ring somewhat similar to the ring of Fig. 5 but which is adapted for use as a rod, shaft or spindle packing.

Fig. 8 shows the packing of Fig. 7 in operating position.

Fig. 9 shows a form of the invention which has been embodied in a piston head which is adapted to form a seal between two concentric bodies.

Fig. 10 shows the packing of Fig. 9 in operating position as embodied in casing cutter or other similar structure.

Fig. 11 shows a form of the packing to be used with two beveled surfaces.

While several forms of the invention have been illustrated in the drawing, it is contemplated that the invention shall embody broadly the idea of a packing or sealing element which is composed of materials of different degrees of hardness. Fig. 1 illustrates a ring 2 which is used preferably for maintaining a seal between two abutting parts such as 3 or 4. These parts may be portions of a pump, boiler, or in fact any construction whatever where it is desired to obtain a seal between the two parts. The part 3 is preferably formed with a recess 5 which is adapted to wholly contain the packing ring or gasket 2. It seems obvious that there can be no escape of pressure from the corner 6 of this recess 5.

The pressure within the parts 3 and 4 in the passage 7 tends, of course, to force the packing or sealing element 2 out between the contacting faces of the parts 3 and 4. The parts 3 and 4 in Fig. 2 have been shown as closely abutting, but, of course, as vibration of the parts occurs or the pressure in the passage 7 is increased there is more or less of a space created between the parts 3 and 4 such as at 8. The pressure in the passage 7 tends to distort the ring 2 and cause it to flow into the space 8 between the parts 3 and 4. It has been found that with packings and gaskets made up wholly of quite resilient material, the pressure causes the material to flow into the space being sealed such as 8. When the packing flows from its normal position it becomes distorted and its efficiency is destroyed. With the present invention, however, it is contemplated that the packing will be specially constructed and have a base or supporting portion 10. This base as seen in Figs. 1 and 2 is of more rigid material than the principal portion 11 of the packing. The portion 10 is preferably of a material of greater hardness than the body 11. If the ring is made of rubber, a harder rubber will be used in making the portion 10 than is used in making the portion 11. It is intended, however, that portions 10 and 11 will be molded or vulcanized together to form an integral packing.

If the ring is to be positioned as shown in Fig. 2 it will be constructed with the support or backing portion 10 on the outer periphery 12 and adjacent the lower edge 13 of the ring. This positioning of the backing or support portion 10 provides a rigid portion adjacent the surface 14 and the surface 15 where they form the corner 16. It is at the corner 16 that the first leakage will occur. The hardened portion 10 thus seats firmly in this corner 16 and tends to block the flow of any part of the packing ring into the space 8. It will be noted that the backing portion 10 is of substantially triangular configuration so that it merges with the body 11 and it seems apparent that adjacent a point such as 17 on the side of the body and 18 on the periphery thereof there will be gradual merging from the more rigid material into the more resilient material.

The inner surface, or surface which is exposed to the pressure is preferably formed with lips such as 20. One of these lips extends outwardly from the center and as seen in Fig. 1 the packing is so formed that the outer surface 21 of the lips extends beyond the normal width of the periphery. The lips are, of course, formed of more resilient material, and if rubber is used a very high grade soft rubber will be employed at this point.

The exposed face of the lips 20 is illustrated at 22 as being convexly curved so that the greatest area will be exposed to pressure. It is, of course, obvious that the tip, or point 23 of the lip, will be the most resilient portion of the lip because the material is thinnest at this point. Thus, when pressure is applied to the lip the edge 23 will be first to create the seal. The pressure, of course, will be applied to the convex surface 22 and gradually press the edge 21 of the ring against the surface abutting against the ring. As the pressure increases or is applied to the ring the entire resilient body 11 is distorted somewhat to take the configuration of the opening within which the body is confined. The portions 17 and 18 will be slightly distorted, but due to the fact that the body 10 is of more rigid material there is a greater resistance to flowing as the base of the ring is approached. When the ring is confined, as shown in Fig. 2, there is, of course, only one point such as the low corner 16 where the ring can escape when pressure is applied. The body 10 is of such rigid material that it will not flow into the space 8 when pressure which the ring is designed to withstand, is applied.

The lips 20 are formed so that their combined width is greater than the periphery 12 so that they will have an inherent resiliency causing them to remain in contact with the confining surfaces at all times. This can be appreciated by comparing the ring of Fig. 1 with the ring of Fig. 2 which latter figure shows that the lips 20 have been compressed somewhat when the parts 3 and 4 were moved together.

It has been found in actual practice that a ring constructed in accordance with the foregoing description forms a perfect seal against exceptionally high pressure and that vibration and loosening of parts does not affect the efficiency of the sealing of the packing and that the parts being sealed can be spaced a considerable distance apart without permitting any distortion of the packing element to such an extent that leakage will occur.

While the invention in Figs. 1 and 2 has been shown and described as a ring construction, it is obviously intended that the packing may be made up in either strip or plate form if desired.

While the invention in Figs. 1 and 2 has been shown and described as having a hardened base adjacent one corner thereof, it is intended that the entire base may be made of rigid material. Such a ring is shown in Figs. 3 and 4. The base in this construction, however, is on the inner circumference of the ring as distinguished from Fig. 1 where the base is on the outer periphery. In Fig. 2 the pressure is applied to the internal surface of the ring, whereas in Fig. 4 it is applied to the exterior surface. The general configuration of the ring, however, is the same, the lips being provided on the outer periphery of the base instead of on the inner circumference.

Fig. 4 shows an arrangement where the part 30 is provided with a flat surface at 31 and the packing 2 is positioned on this surface and is arranged to be held in position by a shoulder 32 of the part 33. This part 33 may be held in position by any desired means, but a locking ring 34 has been illustrated. In this arrangement of the construction the base 35 of the packing element is made up entirely of rigid material. This insures a proper support for the resilient surfaces exposed to the pressure and there will be no distortion of the packing element beyond its elastic limit. The lips of the packing of Fig. 3 are preferably identical with the lips 20 of the Figure 1 embodiment, except that they are adapted to withstand pressures applied radially to the ring but directed toward the center.

Figs. 5, 6, 7, and 8 show another form of the invention wherein the lips 20 instead of extending radially inward as in Fig. 1 or radially outward as in Fig. 2, are adapted to be formed upon one of the ends of the ring. When the ring is so constructed the base or rigid portion 10 may be positioned on the outer periphery of the ring as shown in Figs. 5 and 6 or it may be positioned on the inner periphery of the ring as shown in Figs. 7 and 8. In either event this rigid portion is adapted to be positioned adjacent the point where the lowest pressure is to occur. The resilient ribs are positioned on the high pressure side of the packing so that they will flow against the surfaces to be sealed and initially create a seal.

The pressure applied to the lips is, of course, transmitted through the packing element and causes the more rigid base 10 to abut against its supporting surface. As seen in Fig. 6, there will be more or less distortion of the outer lip 35 due to the enormous pressure of the fluid against the piston. This lip 35 is shown as abutting, as at 36, against the liner or cylinder 37. Adjacent the base 10, however, there is little or no distortion of the ring, and a space such as 38 may occur. This is of particular advantage in a construction of this type because the flange or rim 40 of the piston is thus maintained in spaced relationship with respect to the cylinder or liner 37 and there will be no scoring of the liner and no pinching of the packing element 2 between the flange 40 and the cylinder 37. If resilient materials were used throughout the packing, then the pressure would cause the packing to flow into the space 38 and the same would be pinched between the corner of the flange 40 and the cylinder. Under such circumstances the corner of the packing is quickly destroyed and the service obtained from the packing is materially shortened. In the present instance, however, the gradual merging of the hardened portion 10 and the resilient lips permits of a gradual distortion of the ring so that it will abut against the surface of the cylinder or liner and there can be no flowing of the resilient lips 20 because the opening 38 disappears gradually due to the fact that the body 10 merges gradually into the resilient lip.

Fig. 6 shows a double acting piston 45 having annular grooves 46 in its periphery which are spaced apart by the flange 40. A small rim 47 defines the outer edge of the recesses 46. It is intended that the packing ring 2 will be so formed that it can be extended to pass over the ridge 47 and be seated in the recess or cavity 46. The fact that the more rigid base 10 is on the outer periphery maintains the ring in proper position on the piston and prevents its displacement. Attention is particularly directed to this simplified manner of attaching the packing to the piston because the usual elements such as the follower plates, clamps and bolts which are now employed have been eliminated. When the packing elements become worn they can be easily removed and replaced without removing the piston or replacing any of the piston except the packing ring.

The description in connection with Figs. 5 and 6 applies equally as well to the construction in Figs. 7 and 8, except that the sealing is to be maintained with a revolving shaft such as 50 or the shaft may be subjected to reciprocated movement. In any event, the resilient lips 20 form a seal with the shaft which seal gradually merges into the rigid body 10 which prevents flowing of the material into the space 51 between the shaft and the packing supporting part 52.

Figs. 9 and 10 show a somewhat different form of the invention but which embodies the same general idea of a rigid base portion and resilient pressure surfaces. In these figures a piston ring or base 60 has been provided which is formed with a recess or dovetail groove 61. The rigid base portion of the ring is preferably molded in the form of a tongue 62 which fits in the groove 61 so that the ring is suitably anchored in position. A rigid base 10 extends beyond the tongue 62 and gradually merges as at 63 with the lips 20. Where the ring is to have considerable width, as in Figs. 9 and 10, the lips 20 are spaced apart by a wider body portion such as 64. It is to be understood that the ring of any of the other forms here illustrated may be constructed in this manner if desired.

The ring of Figs. 9 and 10 is constructed so as to provide a seal on the outer periphery 65 as well as on the inner periphery. With this in mind, the rigid base portion 10 is formed with a concave area as at 67 so that the interior and least rigid edges 68 will gradually merge with the resilient lips 69. It is, of course, understood that the lips at the base are vulcanized or molded together so that they form a unitary member which will withstand enormous pressures.

Fig. 10 shows the invention as applied to a casing cutter which is adapted to be operated by fluid pressure. In this construction the cylinder or body of the cutter is shown at 70 and the mandrel or drive for the cutting blades is illustrated at 71. The piston or ring 60 is loosely mounted upon the mandrel shaft 71 and is supported by the springs 72 and 73. These springs form a uniform pressure connection between the piston and the mandrel 71 so that the operating fluid may be applied and serve to depress the piston 60 and the springs so that the spring 73 will then gradually drive the mandrel 71 forward. Under these circumstances it is particularly desirable to obtain a packing which will withstand enormous pressures approximating two or three thousand pounds per square inch, and which will withstand such pressure without distortion and for considerable periods.

The invention has been shown and described with the pressure surfaces both radially and axially of the packing ring. It is contemplated that the ring may be made up in either form so that pressures may be packed which are applied either radially or axially of the element. Of course, when the packing is made up in strip it may be positioned to withstand the pressure in any desired direction.

Fig. 11 shows a form of the invention for packing two abutting surfaces which are provided with beveled faces or which approach each other at an angle. This construction is similar to those previously described with the base 10 of rigid material being positioned adjacent the low pressure side and the resilient lips 20 exposed to the pressure. The combination of the present type packing with a blowout preventer is claimed in my simultaneously filed copending application Serial No. 617,837 for a Blowout preventer.

Having described my invention, what I claim is:

1. A seal ring of the character described including a body of resilient material, a pair of opposed flared lips thereon to form a sealing portion when pressure is applied between them, and a backing supporting portion for said lips including a part of said body of material which is less resilient than said lips and disposed to support the lips so that the more resilient material of the lips will not flow beyond its elastic limit when under pressure.

2. The combination with a recess having walls, of a packing ring, means on said ring to form an inside and an outside seal with said walls including a resilient lip on the side exposed to pressure and a less resilient backing to seat in the recess and formed integral with the lip on the pressure side to prevent flowing of the lip into the recess or beyond the elastic limit of the material when subjected to the estimated pressures which will be applied to the element.

3. A seal for two abutting members including a recess in one of said members, a flat face on the other of said members, a packing disposed in said recess, resilient faces on said packing on the high pressure side thereof, a base on said packing of more rigid material than said faces and disposed on the low pressure side.

4. A piston including a body, a plurality of annular recesses therein, a resilient rubber packing ring snapped into each recess, a pair of oppositely flaring resilient lips on each ring projecting in the direction of pressure, and a comparatively rigid corner on the outer periphery of the base of each ring to reinforce and support the outside lip.

5. A resilient packing including a body composed of portions of soft and hard rubber or the like, inwardly and outwardly flaring lips of soft rubber arranged to receive between them the pressure of the fluid being packed and to move under pressure to form a seal, and a portion of said body behind said lips being composed of harder rubber to support the softer rubber against flowing, said harder portion forming a part of the base of the packing on the opposite side from said lips.

6. A packing, a recess to receive said packing, a joint to be packed at one side of said recess, a hard rubber corner on the packing positioned at the joint side, a soft rubber lip above the hard corner to seal the joint and be reenforced by said hard corner, and an additional soft rubber lip on said packing to seal against the side of the recess.

7. A combination packing and support ring including a support ring, an annular groove in one side thereof, a hard rubber base moulded in said groove, a softer rubber body on said base, and soft rubber lips flaring inwardly and outwardly from one side of said body.

WALTER E. KING.